(12) United States Patent
Wong et al.

(10) Patent No.: US 6,671,275 B1
(45) Date of Patent: Dec. 30, 2003

(54) CROSS-POINT SWITCH WITH DEADLOCK PREVENTION

(75) Inventors: Ming G. Wong, San Jose, CA (US); Xiaodong Zhao, Cupertino, CA (US)

(73) Assignee: Foundry Networks, Inc., Alviso, CA (US)

( * ) Notice: Subject to any disclaimer, the term of this patent is extended or adjusted under 35 U.S.C. 154(b) by 0 days.

(21) Appl. No.: 10/210,108

(22) Filed: Aug. 2, 2002

(51) Int. Cl.[7] ................................................ H04L 12/56
(52) U.S. Cl. ........................ 370/389; 370/428; 370/429
(58) Field of Search ................................. 370/428, 419, 370/401, 402, 392, 404, 405, 470, 414, 389, 486, 412, 429

(56) References Cited

U.S. PATENT DOCUMENTS

| | | | |
|---|---|---|---|
| 4,876,681 A | 10/1989 | Hagiwara et al. ............. 370/60 |
| 5,307,345 A | * 4/1994 | Lozowick et al. |
| 5,663,959 A | 9/1997 | Nakagawa ................... 370/395 |
| 6,035,414 A | 3/2000 | Okazawa et al. .............. 714/7 |
| 6,125,417 A | 9/2000 | Bailis et al. ................. 710/103 |
| 6,144,668 A | * 11/2000 | Bass et al. ................... 370/401 |

OTHER PUBLICATIONS

Copy of International Search Report for Appln. No. PCT/US03/08719, mailed Jun. 17, 2003, 5 pages.
Copy of International Search Report for Appln. No. PCT/US03/08718, mailed Jun. 19, 2003, 6 pages.

* cited by examiner

*Primary Examiner*—Kenneth Vanderpuye
(74) *Attorney, Agent, or Firm*—Sterne, Kessler, Goldstein & Fox, P.L.L.C.

(57) ABSTRACT

A network switch includes a plurality of cross points each having a plurality of ports, a switching fabric that routes traffic between the plurality of cross points, and an arbitrator that arbitrates the traffic in a cut-through mode for packets larger than a predetermined size, and in a store and forward mode for packets smaller than the predetermined size.

62 Claims, 10 Drawing Sheets

CROSS-POINT SWITCH WITH DEADLOCK PREVENTION

CROSS-REFERENCE TO RELATED APPLICATIONS

This application is related to application Ser. No. 10/210, 041, filed on Aug. 2, 2002, entitled CROSS POINT SWITCH WITH OUT-OF-BAND PARAMETER FINE TUNING, Inventors: Xiaodong Zhao and Ming G. Wong, which is incorporated by reference herein.

BACKGROUND OF THE INVENTION

1. Field of the Invention

The present invention relates to a digital data switch, and more particularly, to a digital data switch with mechanisms for prevention of deadlock.

2. Related Art

A network switch is a device that provides a switching function (i.e., determines a physical path) in a data communications network. Switching involves transferring information, such as digital data packets or frames, among entities of the network. Typically, a switch is a computer having a plurality of circuit cards coupled to a backplane. In the switching art, the circuit cards are typically called "blades." The blades are interconnected by a "switch fabric" or "switching fabric," which is a switchable interconnection between blades. The switch fabric can be located on a backplane, a blade, more than one blade, a separate unit from the blades, or on any combination thereof. Each blade includes a number of physical ports that couple the switch to other network entities over various types of media, such as coaxial cable, twisted-pair wire, optical fibers, or a wireless connection, using a communication protocol such as Ethernet, FDDI (Fiber Distributed Data Interface), or token ring. A network entity includes any device that transmits and/or receives data packets over such media.

The switching function provided by the switch typically includes receiving data at a source port from a network entity and transferring the data to a destination port. The source and destination ports may be located on the same or different blades. In the case of "local" switching, the source and destination ports are on the same blade. Otherwise, the source and destination ports are on different blades and switching requires that the data be transferred through the switch fabric from the source blade to the destination blade. In some cases, the data may be provided to a plurality of destination ports of the switch. This is known as a multicast data transfer.

Switches operate by examining the header information that accompanies data in the data frame. In some communications protocols, the header information is structured in accordance with the International Standards Organization (ISO) 7-layer OSI (open-systems interconnection) model. In the OSI model, switches generally route data frames based on the lower level protocols such as Layer 2. In contrast, routers generally route based on the higher level protocols such as Layer 3 and by determining the physical path of a data frame based on table look-ups or other configured forwarding or management routines to determine the physical path (i.e., route).

Ethernet is a widely used lower-layer network protocol that uses broadcast technology. The Ethernet frame has six fields. These fields include a preamble, a destination address, source address, type, data and a frame check sequence. In the case of an Ethernet frame, a digital switch will determine the physical path of the frame based on the source and destination addresses.

A problem of deadlock (also known as lock up, or hang up, or deadly embrace) exists in virtually all modern digital switches. Typical digital switches include multiple ports, each one of which can transmit data to any one of the other ports. Each port has a FIFO, sometimes multiple FIFOs. The switching fabric also typically contains multiple FIFOs, and is responsible for managing and arbitrating data transfer between the various ports. A condition that may occur, particularly during heavy utilization of multiple ports of the same switching fabric, is that as the FIFOs fill up with outgoing data, each port is simultaneously waiting for another port to be allowed to transmit data to that port through the digital switch. For example, port A is waiting for port B, port B is waiting for port C, port C is waiting for port D, and port D is waiting for port A (in a 4 port example). This situation, which is most likely to occur during heavy traffic conditions, is referred to as a deadlock, a "deadly embrace," or a "lockup."

Accordingly, a need exists for a digital switch with a mechanism that ensures that a lockup will not occur, regardless of the size of the packet or amount of data traffic through the digital switch.

SUMMARY OF THE INVENTION

The present invention is directed to a digital data switch with deadlock prevention that substantially obviates one or more of the problems and disadvantages of the related art.

There is provided a network switch including a switching fabric that routes data traffic between the plurality of cross points. Each cross-point has a plurality of ports. An arbitrator arbitrates the data traffic based on a cut-through request for packets above a predetermined size, and based on a store and forward request for packets below the predetermined size.

In another aspect there is provided a network switch including a switching fabric with a plurality of cross points, the switching fabric switching data between a plurality of ports belonging to the plurality of cross points. A cycle-based arbitrator arbitrates traffic within each cross point. A packet-based arbitrator arbitrates traffic between the cross points in response to a store and forward request for packets smaller than the predetermined size and in response to a cut-through request for packets larger than a predetermined size.

In another aspect there is provided a switch including a plurality of cross points connected by a switching fabric, each cross point connected to a plurality of ports. A round-robin arbitrator arbitrates traffic between ports belonging to the same cross point. A packet-switch arbitrator arbitrates traffic between ports belonging to different cross points based on a store-and-forward request for packets smaller than the predetermined size and based on a cut-through request for packets larger than a predetermined size.

In another aspect there is provided a switch including a switching fabric connecting a plurality of ports. A plurality of FIFOs in the switching fabric temporarily store data traffic from the ports. A multi-level arbitrator arbitrates the data traffic between the ports using two levels of arbitration. A first level arbitration is used by the multi-level arbitrator for FIFOs with at least some data. A second level arbitration is used by the multi-level arbitrator for FIFOs with at least one packet.

In another aspect there is provided a method of switching data traffic including the steps of receiving a packet, determining size and destination of the packet, arbitrating packet transmission based on the size of the packet. Packet is arbitrated in a cut-through manner within a cross point of a digital switch, and in a store and forward manner between different cross points of the digital switch.

In another aspect there is provided a method of switching data traffic including the steps of receiving packets from a plurality of sources, determining size and destination of the packets, arbitrating packet transmission of packets larger than a predetermined size in response to a cut-through request, and arbitrating packet transmission of packets smaller than a predetermined size in response to a store-and-forward request.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
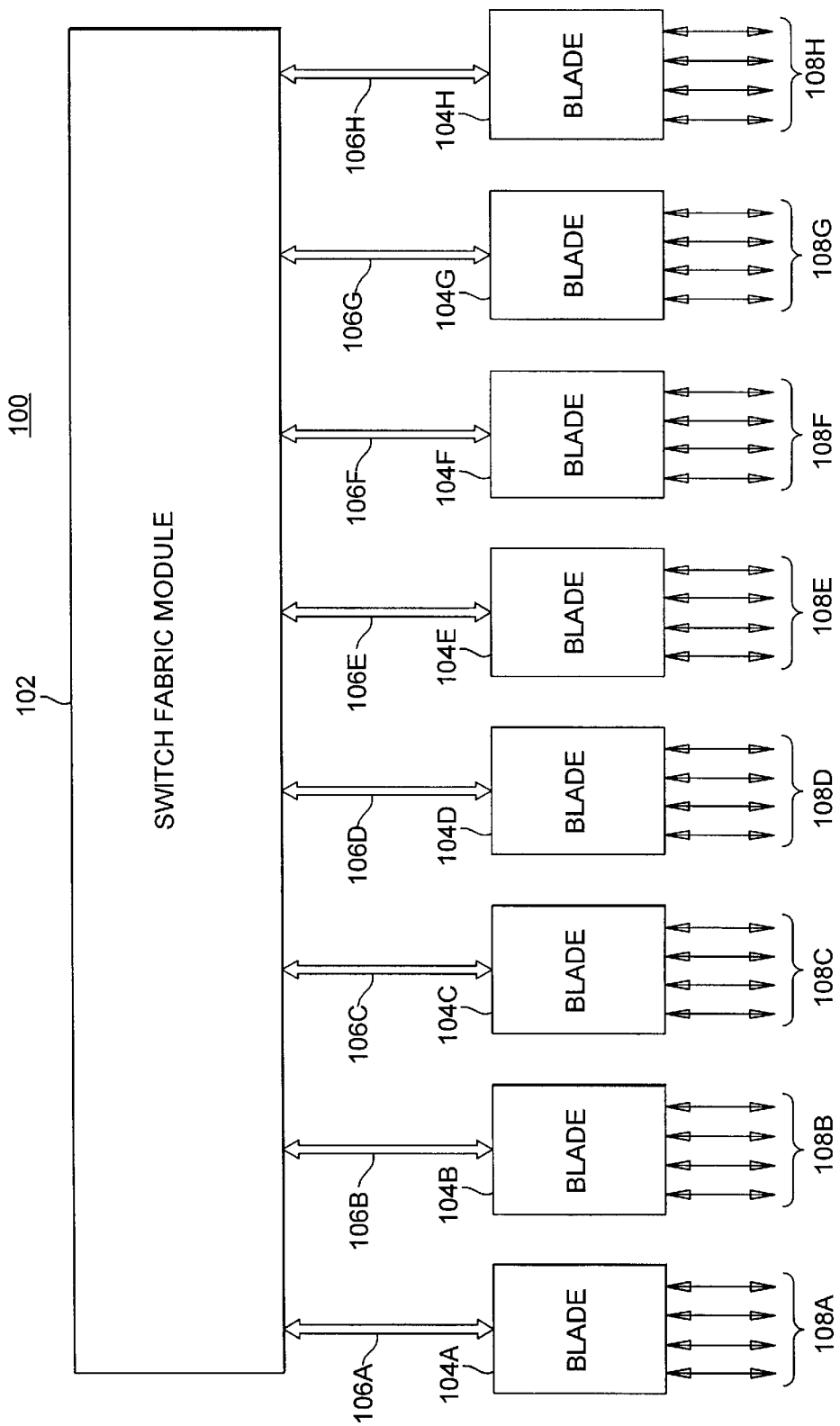
FIG. 1 is a diagram of a high-performance network switch according to an embodiment of the present invention.

An overview of the architecture of one embodiment of a digital switch 100 of the invention is illustrated in FIG. 1. Digital switch 100 includes a switch fabric 102 (also called a switching fabric or switching fabric module) and a plurality of blades 104 (only eight blades are shown in FIG. 1 for clarity). In one embodiment of the invention, digital switch 100 includes blades 104A–104H. Each blade 104 communicates with switch fabric 102 via pipe 106. Each blade 104 further includes a plurality of physical ports 108 for receiving various types of digital data from one or more network connections.

Figure 2:
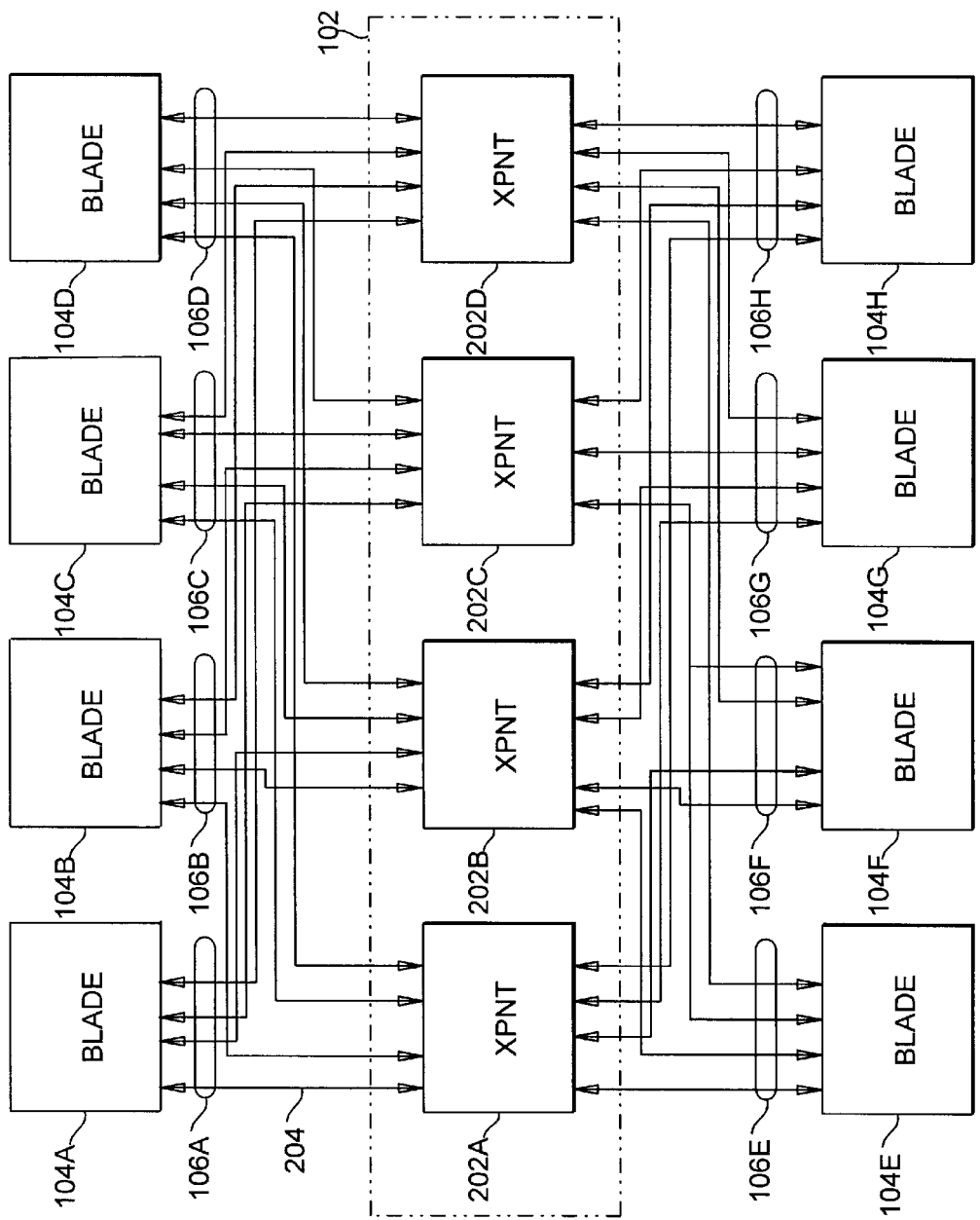
FIG. 2 is a diagram of a high-performance network switch showing a switching fabric having cross point switches coupled to blades according to an embodiment of the present invention.

Referring to FIG. 2, switch fabric 102 includes a plurality of cross points (XPNTs) 202. In each cross point 202, there is a set of data structures, such as data FIFOs (First in, First out data structures) (see FIG. 5 and discussion below). The data FIFOs store data based on the source port and the destination port. In one embodiment, for an 8-port cross point, eight data FIFOs are used.

Of the cross points 202A–202D shown in FIG. 2, only a subset may be used in the overall switching fabric. For example, in a "Cross Point 8" (or XPNT8) embodiment for eight blades, only one cross point 202A may be employed. A 15-blade cross point ("Cross Point 15" or XPNT15) may utilize two XPNT8's (e.g., 202A and 202B as a single unit), such that XPNT15 has all the logic of two XPNT8's, plus additional logic. A four-cross point switching fabric may therefore have two XPNT15's.

Each data FIFO stores data associated with a respective source port and destination port. Packets coming to each source port are written to the data FIFOs that correspond to a source port and a destination port associated with the packets. The source port is associated with the port (and port slice, see discussion below with reference to FIG. 4 and elements 402A–402H) on which the packets are received. The destination port is associated with a destination port ID (corresponding to a forwarding ID, or FID) or slot number that is found in-band or side-band in data sent to a port.

Figure 3:
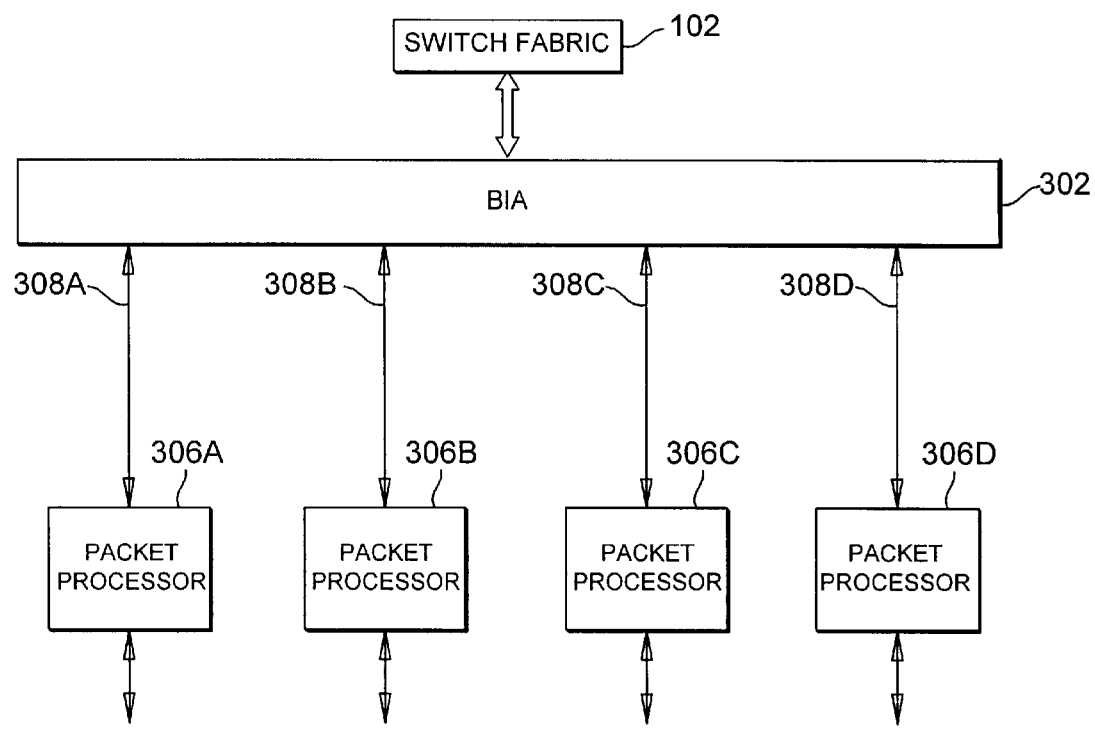
FIG. 3 is a diagram of a blade used in the high-performance network switch of FIG. 1 according to an embodiment of the present invention.

Referring now to FIG. 3, the architecture of a blade 104 is shown in further detail. Blade 104 comprises a backplane interface adapter (BIA) 302 and a plurality of packet processors 306. BIA 302 is responsible for sending the data across the cross point of switch fabric 102. In a preferred embodiment, BIA 302 is implemented as an application-specific circuit (ASIC). BIA 302 receives data from packet processors 306. BIA 302 may pass the data to switch fabric 102 or may perform local switching between the local ports on blade 104.

Each packet processor 306 includes one or more physical ports. Each packet processor 306 receives inbound packets from the one or more physical ports, determines a destination of the inbound packet based on control information, provides local switching for local packets destined for a physical port to which the packet processor is connected, formats packets destined for a remote port to produce parallel data and switches the parallel data to an IBT 304.

In the example illustrated in FIG. 3, packet processors 306C and 306D comprise 24—ten or 100 megabit per second Ethernet ports, and two 1000 megabit per second (i.e., 1 Gb/s) Ethernet ports. Before the data is converted, the input data packets are converted to 32-bit parallel data clocked at 133 MHz. Packets are interleaved to different destination ports.

BIA 302 receives the bit streams from packet processors 306, determines a destination of each inbound packet based on packet header information, provides local switching between local packet processors 306, formats data destined for a remote port, aggregates the bit streams from packet processors 306 and produces an aggregate bit stream. The aggregated bit stream is then sent across the four cross points 202A–202D.

Figure 4:
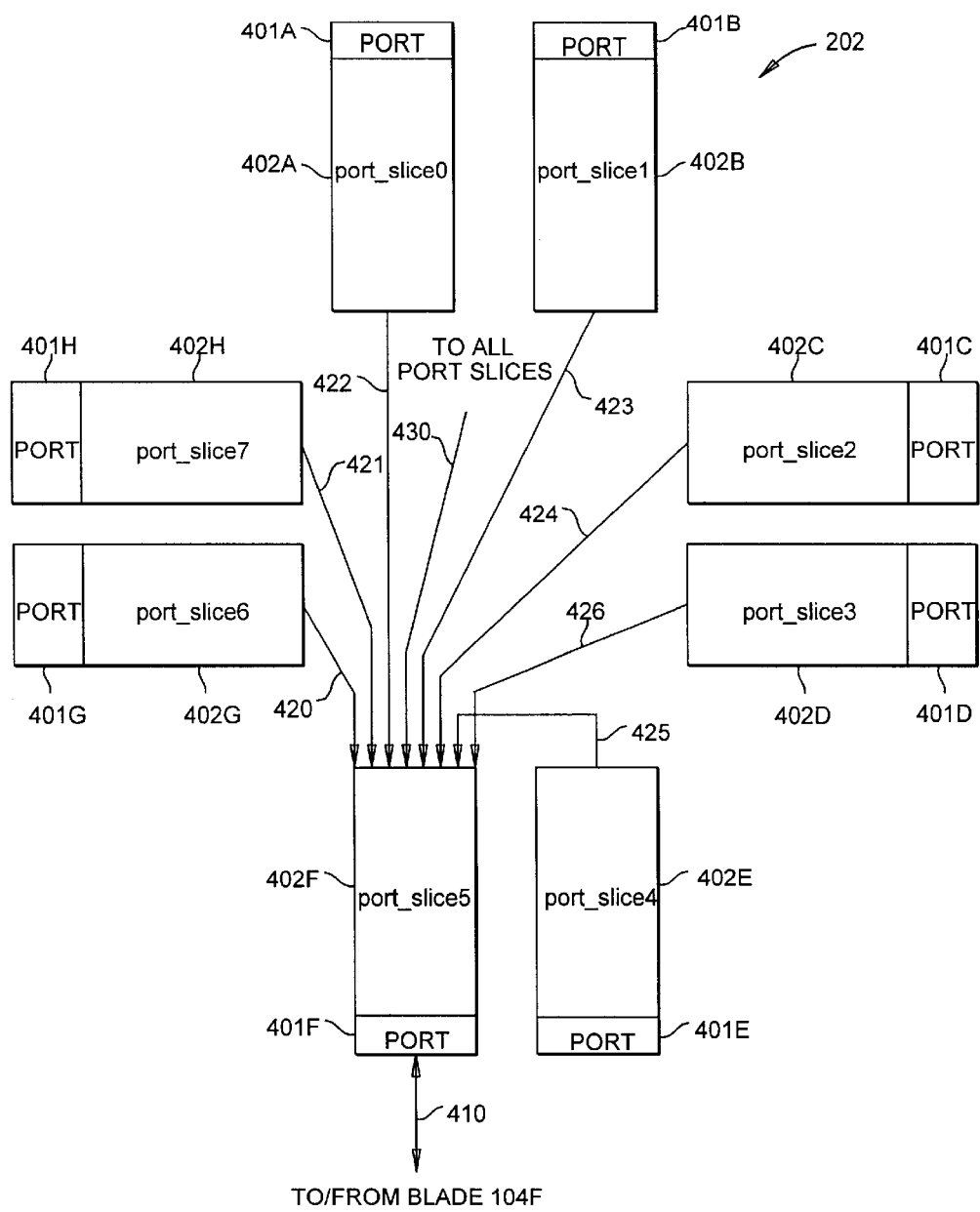
FIG. 4 is a diagram of the architecture of a cross point switch with port slices according to an embodiment of the present invention.

FIG. 4 illustrates the architecture of a cross point 202. Cross point 202 includes eight ports 401A–401H coupled to eight port slices 402A–402H. As illustrated, each port slice 402 is connected by a wire (or other connective media) to each of the other seven port slices 402. Each port slice 402 is also coupled to through a port 401 a respective blade 104. To illustrate this, FIG. 4 shows connections for port 401F and port slice 402F (also referred to as port_slice 5). For example, port 401F is coupled via link 410 to blade 104F.

Port slice 402F is coupled to each of the seven other port slices 402A–402E and 402G–402H through links 420–426. Links 420–426 route data received in the other port slices 402A–402E and 402G–402H that has a destination port number (also called a destination slot number) associated with a port of port slice 402F (i.e. destination port number 5). Finally, port slice 402F includes a link 430 that couples the port associated with port slice 402F to the other seven port slices. Link 430 allows data received at the port of port slice 402F to be sent to the other seven port slices. In one embodiment, each of the links 420–426 and 430 between the port slices are buses to carry data in parallel within the cross point 202. Similar connections (not shown in the interest of clarity) are also provided for each of the other port slices 402A–402E, 402G and 402H.

Figure 6:
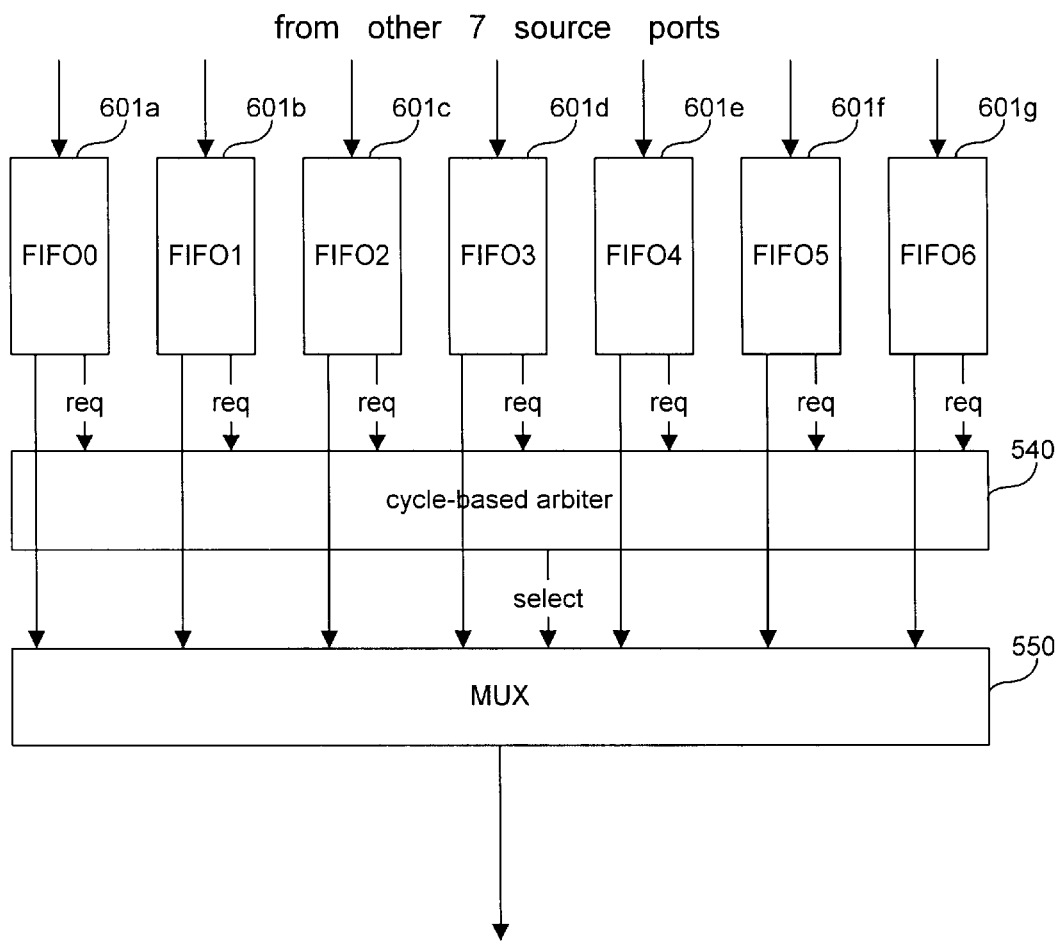
FIG. 6 shows a somewhat simplified schematic of a cross point 8 (XPNT8) slice.

FIG. 6 illustrates a somewhat simplified architecture of one port or slice of a XPNT8. A XPNT8 is an 8-port switch, in which a packet is switched from each port to any other of seven ports based on a 3-bit slot number in a side channel. As shown in FIG. 6, each port has seven FIFOs 601a–601g to store data coming from the other seven source ports. Note that in FIG. 6, only seven FIFOs (FIFO0–FIFO6) are shown, however, in the actual XPNT8, the number of FIFOs is eight times what is shown in FIG. 6 (i.e., each of the eight ports has seven FIFOs to receive data from the other seven ports). When packets from multiple ports are forwarded to a particular port using cycle-based arbitrator 540 (FIFO read arbitrator 540) and a multiplexer 550, data may be selected from one of the possible seven FIFOs 601a–601g every cycle based on a round-robin arbitration scheme.

Figure 5:
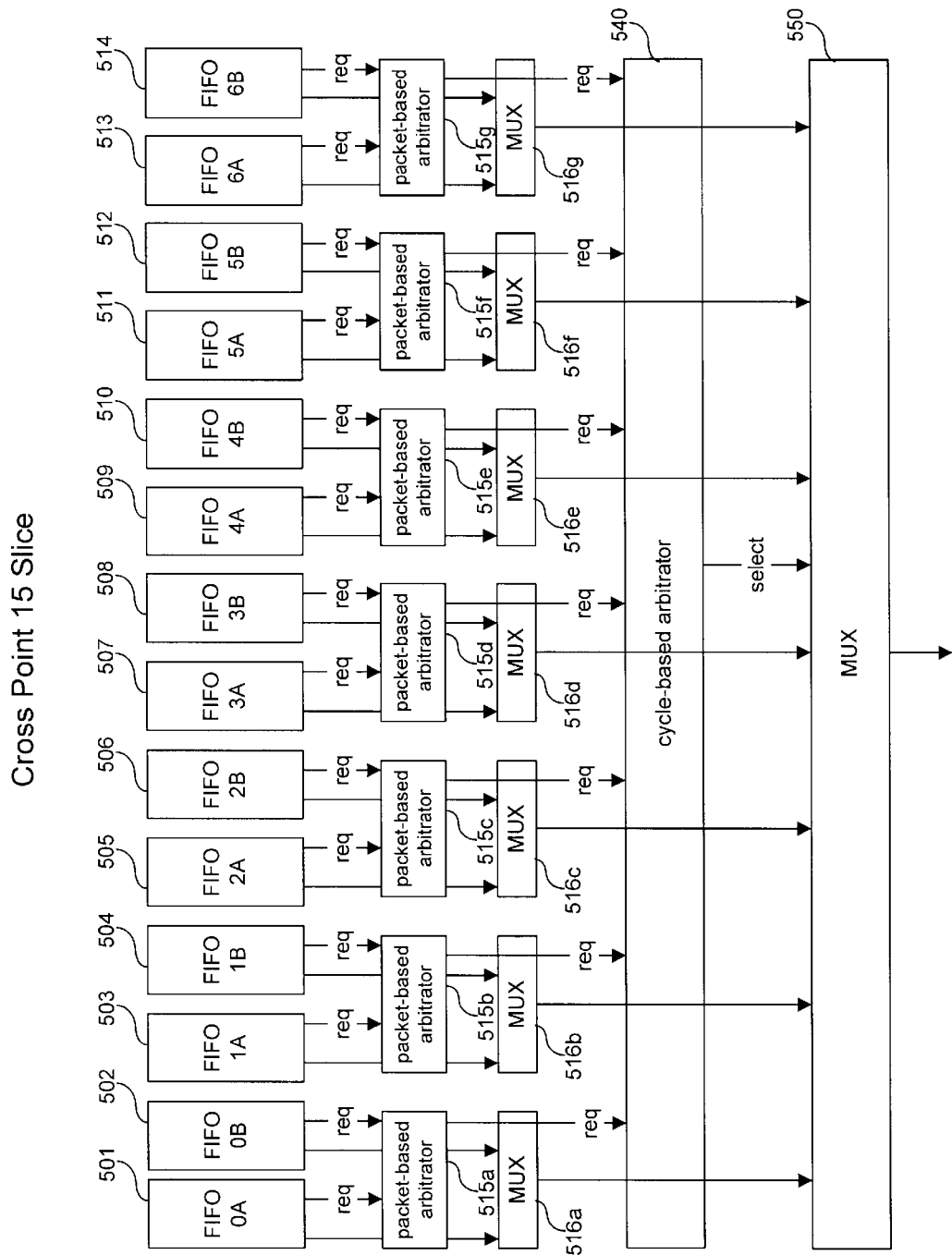
FIG. 5 shows a somewhat simplified schematic of a cross point 15 (XPNT15) slice.

FIG. 5 illustrates an architecture of a slice of a XPNT15. Here, a "slice" refers to a 16-bit slice of the XPNT15, which is a 64-bit wide device. Thus, the XPNT15 has four 16-bit slices.

The XPNT15 logically includes two XPNT8's. Since the XPNT15 allows for only a 3-bit slot number to direct packets to seven destinations, the XPNT15 relies on the upper 2 bits of a 16-bit FID (forwarding, or destination ID) to augment the 3-bit slot number for switching packets between 15 ports (or to 14 other ports from any given source port). Note that when a packet is received, destination address information in the header of the packet is compared to the compare field of a CAM (content addressable memory) to retrieve a forwarding identifier (FID). The FID is used for packet routing and to lookup a port mask that identifies the port or ports to which the packet should be routed.

Each port in the XPNT15 has two groups of seven FIFOs, and each group is responsible for storing data coming from the other seven source ports. The FIFOs are designated 501-514 in FIG. 5, including group A, i.e., FIFOs 501, 503, 505, 507, 509, 511 and 513, and group B, i.e., FIFOs 502, 504, 506, 508, 510, 512, and 514. FIG. 5 also shows that for each FIFO of groups A and B, there is a corresponding packet-based arbitrator 515a–515g. Each FIFO in group A and in FIFO group B (for example, FIFO 501 and FIFO 502) has a corresponding multiplexer, designated 516a–516g in FIG. 5, for selection of either an output of FIFO group A, or an output of FIFO group B. In FIG. 5, FIFOs of the A group (FIFOs 501, 503, 505, 507, 509, 511 and 513) take input from source ports 0–6 and FIFOs of the B group (FIFOs 502, 504, 506, 508, 510, 512, and 514) take input data from source ports 7–13. Note that the request (req) signal from the FIFOs may be for either cut-through arbitration, or for store-and-forward arbitration.

In a stand-alone XPNT8, the FIFO request is cut-through and arbitration is cycle based., Within each XPNT8 of the XPNT15, the FIFO request is cut-through and arbitration is cycle based. Between the two XPNT8's (that make up the XPNT15), the FIFO request can be cut-through or store forward, depending on the packet size. Arbitration between the two XPNT8's is packet-based.

Each data FIFO includes a FIFO controller and FIFO random access memory (RAM) (not shown in the figures). The FIFO controllers are coupled to FIFO cycle based arbitrator 540 and to packet-based arbitrators 515. FIFO RAMs are coupled to a multiplexer 550. Cycle-based arbitrator 540 and packet-based arbitrators 515 are further coupled to multiplexer 550. "Cycle" in this context refers to the system clock cycle, for example, 133 MHz being a system clock frequency. (Note that in an actual implementation, both arbitrators may be implemented as a single integrated circuit, or IC.)

During operation, the FIFO RAMs accumulate data. After a data FIFO RAM has accumulated one cell of data, its corresponding FIFO controller generates a read request to cycle-based arbitrator 540 or to packet-based arbitrators 515. (Here, a cell may be 8 bytes, or FIFO depth for cut-through requests, and one packet for store and forward requests.) Cycle-based arbitrator 540 or packet-based arbitrator 515 process read requests from the different FIFO controllers in a desired order, such as a round-robin order. After data is read from one FIFO RAM, cycle-based arbitrator 540 will move on to process the next requesting FIFO controller.

To process a read request, cycle-based arbitrator 540 or packet-based arbitrator 515 switches multiplexer 550 to forward a cell of data from the data FIFO RAM associated with the read request.

In this way, arbitration proceeds to service different requesting FIFO controllers and distribute the forwarding of data received at different source ports. This helps maintain a relatively even but loosely coupled flow of data through cross points 202.

Figure 7:
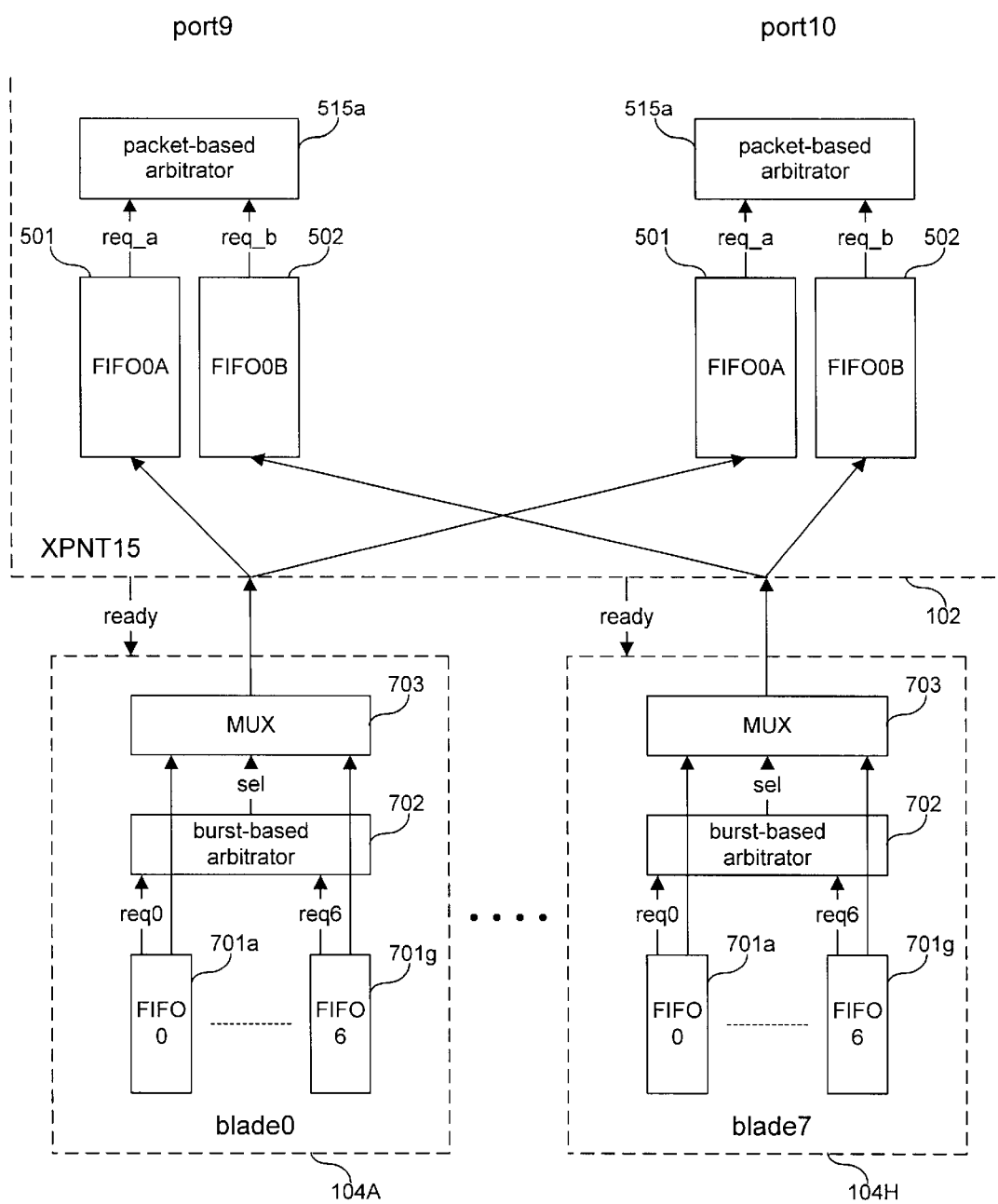
FIG. 7 illustrates how deadlock occurs in a XPNT15.

FIG. 7 illustrates how a deadlock condition may arise in a XPNT15. As shown in FIG. 7, multiple blades (e.g., 104A–104H) are connected to the XPNT15 by being inserted into the backplane. Each of the blades 104 includes a plurality of FIFOs (in this case, 7 FIFOs 701a–701g), a burst-based arbitrator 702, and a multiplexer 703 to select one of the blade FIFOs 701a–701g. Note that conceptually, a burst-based arbitrator is "between" cycle-based arbitrator 540 utilized by a stand-alone XPNT8, and packet-based arbitrators 515 utilized by the XPNT15. FIG. 7 also shows two slices of two ports, port9 and port10, and two corresponding FIFOs, FIFO0A and FIFO0B (501 and 502 of FIG. 5). FIG. 7 also shows packet-based arbitrators 515, which are the same packet-based arbitrators 515 as illustrated in FIG. 5.

Since the second level arbitration rotates at the packet boundary, and a FIFO can participate and be selected for data transmission when it has at least one entry of data, a deadlock condition can occur under certain uncommon data traffic patterns being applied to XPNT15. An example of such uncommon data traffic patterns is a cross point switch with, e.g., four blades, each of which has a FIFO that is filled up, with the data in each FIFO destined for the other three blades. In such a situation, each of the blades will wait for the other blade to release the back pressure, causing deadlock.

Deadlock occurs when a minimum of two companion blades (for example, blade0 (104A) and blade7 (104H)) send packets to two other destination blades simultaneously. Here, of the 16 blades in XPNT15, companion blades are blade0/blade7, blade1/blade8, . . . , blade6/blade13.

For purposes of example, assume that the two destination slots are slot9 and slot10 corresponding blade9 and blade10, respectively. Both blade0 (104A) and blade1 (104B) in their backplane transmit logic have seven FIFOs with packets destined for slots0–13. FIFO0 (601a in FIG. 6) contains data destined for slot0 and slot7, FIFO1 (530b) contains data destined for slot1 and slot8, . . . , FIFO6 (601h) contains data destined for slot6 and slot13. The backplane cycle-based arbitrator 540 performs round-robin rotation to select data to be transmitted from each FIFO that contains data. A stream of data with predetermined burst size is read from the selected FIFO. If back-pressure (i.e., 'ready' signal is de-asserted because the FIFO is full) is detected in the middle of a burst, cycle-based arbitrator 540 would not rotate to another requesting FIFO, until the back-pressure is released by XPNT15, and transmission of the pending burst is completed.

Figure 8:
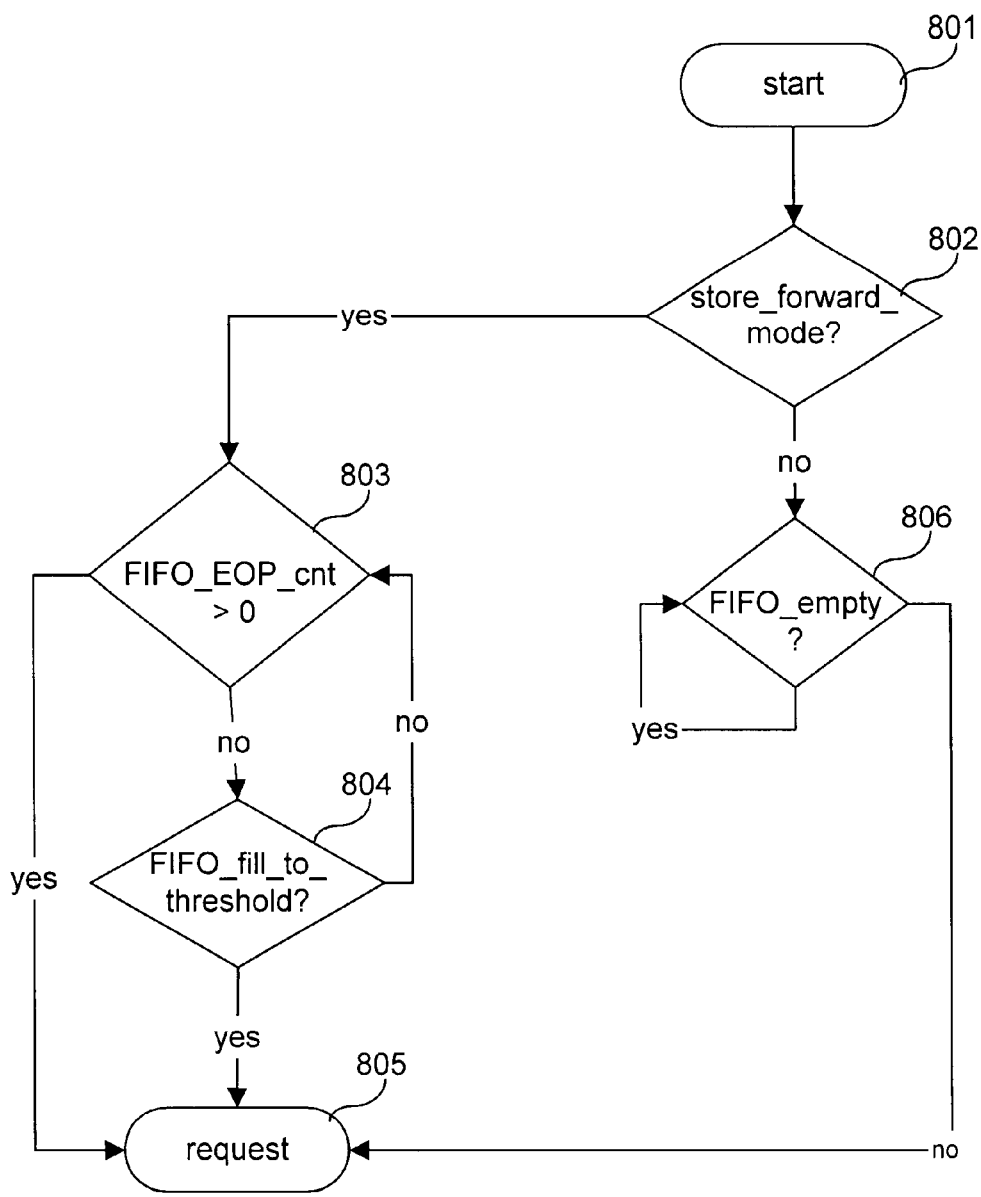
FIG. 8 illustrates a XPNT15 first level FIFO request.

FIG. 8 illustrates the operation of a first level FIFO request of XPNT15. As shown in FIG. 8, the first step is the start step 801. The next step, step 802 is to determine whether the FIFO is in a store and forward mode. If the FIFO is not in a store and forward mode, the next step (step 806) is to check whether the appropriate FIFO is empty. As long as the FIFO is empty, the XPNT15 cycles through the same step 806. If the FIFO is not empty, the next step is for the FIFO to request arbitration (step 805). If the FIFO is not requesting arbitration while in a store and forward mode, the next step is for cycle-based arbitrator 540 to check to see if the FIFO end of packet (EOP signal) count is greater than 0 (step 803). If the count is greater than 0, then the FIFO proceeds to step 805 (the request step), if it is not, then cycle-based arbitrator 540 checks to see if the FIFO is filled to the threshold (step 804). If the FIFO is not filled to the threshold, the FIFO logic cycles back to step 803. If it is, the FIFO proceeds to the step of requesting arbitration (805).

At the first level arbitration in the same cross point, cycle-based arbitrator 540 performs round-robin rotation to select the two requesting FIFOs containing data from two companion source slots. An entire packet has to be read from the selected FIFO before cycle-based arbitrator 540 rotates to the other requesting FIFO. This occurs because destination blade 104 is not able to sort data coming from the companion blades, if the data is interleaved. If the selected FIFO becomes empty before an end of packet (EOP) signal is detected, cycle-based arbitrator 540 has to wait for the EOP signal before it can service the other requesting FIFO.

In this example, blade0 (104A) sends bursts of data alternately to destination slot9 and destination slot10. Blade7 (104H) does the same. If blade0 (104A) detects back-pressure in the middle of the data burst to destination slot10, after it finished a burst that does not contain an EOP signal to slot9, cycle-based arbitrator 540 cannot rotate until it finishes the current burst. Concurrently, if cycle-based arbitrator 540 in port9 of XPNT15 is servicing the packet in FIFO group A (FIFOs 501, 503, 505, 507, 509, 511 and 513) pending receipt of EOP signal from blade0 (104A), it cannot rotate until EOP signal is detected. If the situation persists long enough for FIFO group B (FIFOs 502, 504, 506, 508, 510, 512, and 514) in port9 to fill up, a back-pressure is applied to blade7 (104H). If the back-pressure happens while blade7 (104H) is in the middle of bursting data to slot9, its arbitrator 702 cannot rotate until back-pressure is released from slot9. Meanwhile, if cycle-based arbitrator 540 in port10 of XPNT15 is servicing a FIFO in group B (FIFOs 502, 504, 506, 508, 510, 512, and 514) that does not have an EOP signal, which does not come unless arbitrator 702 of blade7 (104H) can rotate and start sending data to slot10 again. This establishes a deadlock condition, where both arbitrators 702 in blade0 (104A) and blade7 (104H) are stopped in the middle of bursting data to slot10 and slot9, respectively, and arbitrators 540 in port9 and port10 of XPNT15 are both serving FIFO group A (FIFOs 501, 503, 505, 507, 509, 511 and 513) and FIFO group B (FIFOs 502, 504, 506, 508, 510, 512, and 514), respectively. Neither FIFO group A (FIFOs 501, 503, 505, 507, 509, 511 and 513) in port9 nor FIFO group B (FIFOs 502, 504, 506, 508, 510, 512, and 514) in port10 of XPNT15 contain EOP signal.

FIFO group A (FIFOs 501, 503, 505, 507, 509, 511 and 513) in port9 and FIFO group B (FIFOs 502, 504, 506, 508, 510, 512, and 514) in port10 of XPNT15 eventually becomes empty, and FIFO group B (FIFOs 502, 504, 506, 508, 510, 512, and 514) in port9 and FIFO group A (FIFOs 501, 503, 505, 507, 509, 511 and 513) in port10 of XPNT15 are both filled up to trigger back-pressure being applied to both blade0 (104A) and blade7 (104H).

Typically, effective FIFO depth is FIFO size (for example, 2K bytes) reduced by a number of bytes that is related to the latency of the system. For example, 40 cycles latency and 8 bytes (i.e., 64 bit wide data path) is equivalent to 320 bytes in a 64-bit wide cross point and 133 MHz clock. Thus, effective FIFO threshold (depth), in this case, is 2048−320= 1728 bytes.

When packets from multiple ports are forwarded to a particular port, a two-level arbitration scheme may be used. At the first level of arbitration, one of seven possible FIFOs is selected based on the round-robin scheme used in XPNT8. At the second level of arbitration, data is selected from one of two candidate FIFOs as result of the first level arbitration. Unlike the first level arbitration, the second level arbitration rotates at the packet boundary, rather than cycle boundary. A particular FIFO qualifies to participate in both first and second level arbitration when it has at least one entry of data (i.e., at least some data).

Figure 9:
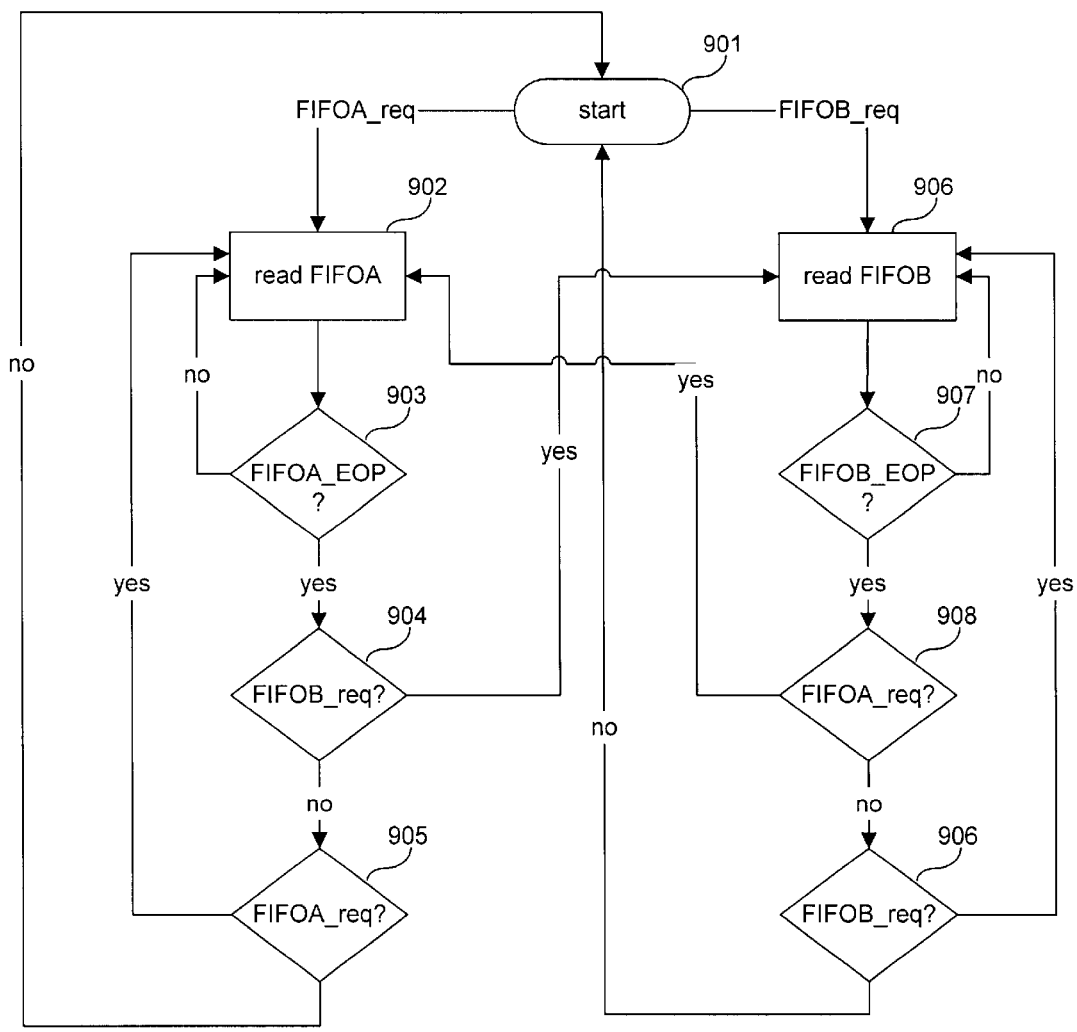
FIG. 9 illustrates a XPNT15 first level packet based arbitration.

FIG. 9 illustrates a first level packet based arbitration of the XPNT15. As show in FIG. 9, after the start step (step 901), there is either a request for arbitration from group A of the FIFOs (FIFOs 501, 503, 505, 507, 509, 511 and 513) or group B of the FIFOs (FIFOs 502, 504, 506, 508, 510, 512, and 514). If arbitrator 515 chooses a FIFO from group A (step 902), the next step is to see if a complete packet is present in FIFO group A, by testing to see if there is an end of packet (EOP signal) symbol in the FIFO (step 903). If there is not, then arbitrator 515 cycles back to the read FIFO group A step (step 902). If there is, then, the next step is to check if there is a request from FIFO group B (FIFOs 502, 504, 506, 508, 510, 512, and 514) (step 904). If there is not, then the next step is to again check if a FIFO in group A (FIFOs 501, 503, 505, 507, 509, 511 and 513) is sending a request for arbitration (step 905). If it is, then arbitrator 515 cycles back to the read FIFO group A step (step 902). If there is not, then arbitrator 515 cycles back to the start step 901. If at step 904, there is a request for arbitration from FIFO group B (FIFOs 502, 504, 506, 508, 510, 512, and 514), then arbitrator 515 proceeds to step 905 (read FIFO group B). Similarly, from the start step 901, if there is only a request for arbitration from FIFO group B (FIFOs 502, 504, 506, 508, 510, 512, and 514) at the start step 901, arbitrator 515 proceeds to step 906. After step 906, the next step is to test if the FIFO in group B has a complete packet, by checking if there is an EOP signal symbol in the FIFO (step 907). If there is not, then arbitrator 515 cycles back to step 906. If there is, then arbitrator 515 goes to step 908 to see if FIFO group A is requesting arbitration (step 908), if it is, then arbitrator 515 proceeds to step 902. If there is not, arbitrator 515 proceeds to step 906 to see if FIFO in group B is requesting arbitration. If it is, then arbitrator 515 cycles back to step 906. If it is not arbitrator 515 goes back to the start step 901.

Figure 10:
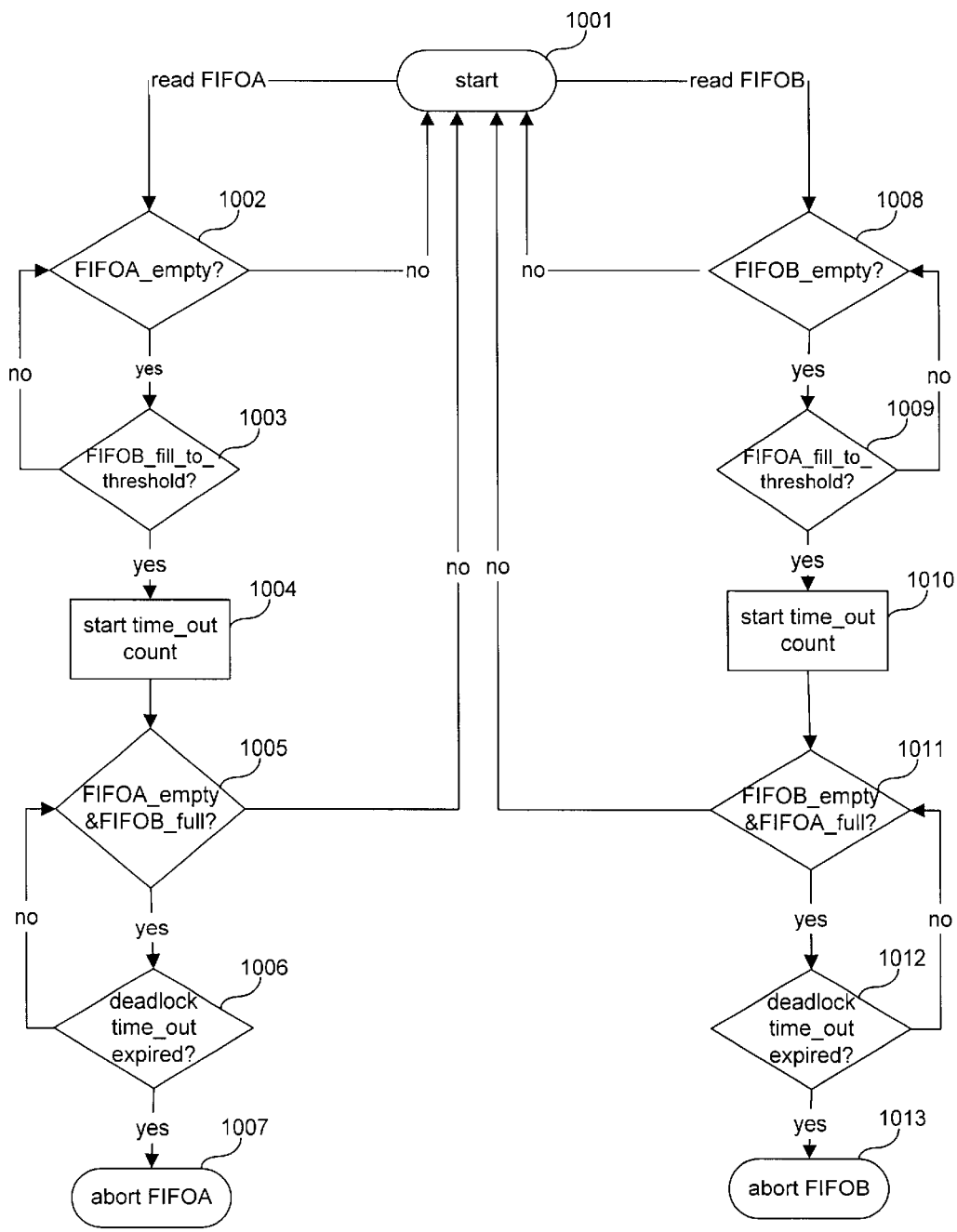
FIG. 10 illustrates a XPNT15 deadlock detection.

FIG. 10 illustrates a flowchart of deadlock detection by XPNT15. As shown FIG. 10, at the start step 901, arbitrator 515 sends a read command to the FIFO group A (FIFOs 501, 503, 505, 507, 509, 511 and 513) and FIFO group B (FIFOs 502, 504, 506, 508, 510, 512, and 514). With respect to FIFO group A, arbitrator 515 checks to see if FIFO group A is empty (step 902). If it is not arbitrator 515 cycles back to the start step 901. If it is the next step is to check if FIFO group B is filled to its threshold (step 903). If it is not filled, then arbitrator 515 cycles back to step 1002. If it is, the timeout counter is started (step 1004). The next step on the FIFO group A branch is to check if FIFO group A is empty and FIFO group B is full (step 1005). If it is not, arbitrator 515 cycles back to the start step 1001. If it is, then arbitrator 515 checks if the deadlock timeout period hasn't expired (step 1006). If it has not, arbitrator 515 cycles back to 1105. If it has expired, then FIFO group A is aborted (step 1007), and arbitrator 515 rotates to another FIFO.

Similarly, on the FIFO group B branch, arbitrator 515 checks to see if FIFOs in group B (FIFOs 502, 504, 506, 508, 510, 512, and 514) are empty (step 1008). If they are not empty, arbitrator 515 cycles back to the start step 1001. If they are empty, the next step is to check to see if FIFOs in group A are filled to its threshold (step 1009). If FIFOs in group A (FIFOs 501, 503, 505, 507, 509, 511 and 513) are not full, arbitrator 515 cycles back to step 1008. If FIFOs in group A (FHFOs 501, 503, 505, 507, 509, 511 and 513) are full, arbitrator 515 starts the timeout counter (step 1010). The next step is to check to see if FIFOs in group B (FIFOs 502, 504, 506, 508, 510, 512, and 514) are empty and FIFO group A (FIFOs 501, 503, 505, 507, 509, 511 and 513) is full (step 1011). If they are not, arbitrator 515 cycles back to the start step 1001. If they are, arbitrator 515 checks to see if deadlock timeout period has expired (step 1012). If the timeout period has not expired, arbitrator 515 cycles back to the previous step (step 1011). If the timeout period has expired, arbitrator 515 aborts FIFO group B (i.e., aborts the reading of the data from FIFO group B) (step 1013), and rotates to another FIFO.

However, if the packet size is larger than effective FIFO depth, the FIFO has to request for transmission even though only a partial packet has been written to the FIFO. In this case, deadlock can still occur. When deadlock occurs, a deadlock counter is started. If the deadlock counter expires when deadlock persists, cycle-based arbitrator 540 will abort reading the FIFO it is servicing and rotate to the other requesting FIFO.

To resolve the deadlock condition in XPNT15, in the first level arbitration, for packets with sizes less than that of the effective FIFO depth in XPNT15, if a FIFO does not request for transmission until it receives an entire packet, then cycle-based arbitrator 540 is guaranteed to rotate to the next requesting FIFO when EOP signal is read from the current FIFO. This eliminates any occurrence of deadlock if a packet can fit in the FIFO.

For packet sizes less than a predetermined size, e.g., effective FIFO depth of 1728 bytes, a FIFO is allowed to participate in the second level arbitration only when it contains at least one entire packet, instead of one entry of data, as described above. For the effective FIFO depth of 1728 bytes, a packet with size greater than 1728 bytes cannot be entirely stored in the FIFO. Thus, as discussed above, a FIFO is allowed to participate in the second level arbitration when it fills up to a predetermined level, to accommodate packets with sizes greater that the effective FIFO depth. This also means that a deadlock can still occur, under the same uncommon traffic conditions, for packets with sizes greater than 1728 bytes.

Another possibility for eliminating deadlock condition in XPNT15 is to give cycle-based arbitrator 540 in the source blade 104 the option of not stopping in the middle of a burst when back-pressure is detected. Instead, if back-pressure is detect in the middle of a burst, cycle-based arbitrator 540 will finish the burst and rotate to service another requesting FIFO. This way, deadlock condition can be completely eliminated regardless of packet size. Thus, when onset of the deadlock condition is detected, the second level arbitration logic aborts the particular FIFO causing the deadlock condition and rotates to another candidate from another group of seven FIFOs.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A network switch comprising:
   a switching fabric that routes data traffic between the plurality of cross points, each cross-point having a plurality of ports; and
   an arbitrator that arbitrates the data traffic based on a cut-through request for packets larger than a predetermined size, and based on a store and forward request for packets smaller than the predetermined size.

2. The network switch of claim 1, wherein the predetermined size is up to a capacity of a FIFO of one of such plurality of cross points.

3. The network switch of claim 1, wherein each port includes a packet processor.

4. The network switch of claim 1, wherein the switching fabric begins data traffic transmission based on the cut-through request when a FIFO of a port has less than a packet of data.

5. The network switch of claim 4, wherein the switching fabric begins data traffic transmission based on the store and forward request when a FIFO of a port contains at least a packet of data.

6. The network switch of claim 5, wherein, upon detection of a deadlock for packets greater than the predetermined size, the arbitrator aborts a FIFO that causes the deadlock, and rotates to another FIFO.

7. The network switch of claim 6, wherein the predetermined size of the packets is up to FIFO size.

8. The network switch of claim 6, wherein each cross point has a plurality of FIFOs corresponding to ports of at least one other cross point.

9. The network switch of claim 1, wherein the switching fabric begins data traffic transmission based on the store and forward request when a FIFO of a port contains at least a packet of data.

10. The network switch of claim 1, wherein, upon detection of a deadlock for packets greater than the predetermined size, the arbitrator aborts a FIFO that causes the deadlock, and rotates to another FIFO.

11. The network switch of claim 1, further including a plurality of blades each connected to a corresponding port and having a plurality of FIFOs corresponding to other ports of the same cross point.

12. The network switch of claim 1, wherein each cross point has a plurality of FIFOs corresponding to ports of at least one other cross point.

13. The network switch of claim 1, wherein, upon detection of a deadlock, the arbitrator aborts a FIFO of a port that causes the deadlock, and rotates to another FIFO.

14. A network switch comprising:
a switching fabric including a plurality of cross points, the switching fabric switching data between a plurality of ports belonging to the plurality of cross points;
a cycle-based arbitrator that arbitrates traffic within each cross point; and
a packet-based arbitrator that arbitrates traffic between the cross points in response to a store and forward request for packets smaller than a predetermined size and in response to a cut-through request for packets larger than the predetermined size.

15. The network switch of claim 14, wherein the predetermined size of the packets is up to FIFO size.

16. The network switch of claim 14, wherein each port includes a blade.

17. The network switch of claim 14, further including a multiplexer to select an output of one port out of the plurality of ports in response to either the cut-through request or the store-and-forward request.

18. The network switch of claim 14, wherein arbitration in response to the cut-through request begins when a FIFO of a port has data in it.

19. The network switch of claim 18, wherein arbitration in response to the store-and-forward request begins when a FIFO of a port has a packet in it.

20. The network switch of claim 19, wherein, upon detection of a deadlock for the packets larger than the predetermined size, the arbitrator aborts a FIFO that causes the deadlock, and rotates to another FIFO.

21. The network switch of claim 20, wherein each cross point has a plurality of FIFOs corresponding to ports of at least one other cross point.

22. The network switch of claim 14, wherein arbitration in response to the store-and-forward request begins when a FIFO of a port has a packet in it.

23. The network switch of claim 14, wherein, upon detection of a deadlock for the packets larger than the predetermined size, the arbitrator aborts a FIFO that causes the deadlock, and rotates to another FIFO.

24. The network switch of claim 14, wherein each cross point has a plurality of FIFOs corresponding to ports of at least one other cross point.

25. The network switch of claim 14, wherein, upon detection of a deadlock, the packet-based arbitrator aborts a FIFO that causes the deadlock, and rotates to another FIFO.

26. A switch comprising:
a plurality of cross points connected by a switching fabric, each cross point connected to a plurality of ports;
a round-robin arbitrator that arbitrates traffic between ports belonging to the same cross point; and
a packet-switch arbitrator that arbitrates traffic between ports belonging to different cross points based on a store-and-forward request for packets smaller than the predetermined size and based on a cut-through request for packets larger than a predetermined size.

27. The network switch of claim 26, wherein the predetermined size of the packets is up to FIFO size.

28. The network switch of claim 26, wherein each of the ports includes a blade.

29. The network switch of claim 26, further including a multiplexer to select an output of one port out of the plurality of ports in response to either the cut-through request or the store and forward request.

30. The network switch of claim 26, wherein the arbitrator arbitrates between ports of different cross points.

31. The network switch of claim 30, wherein the transmission of data in response to the cut-through request begins when a FIFO of a port has data in it.

32. The network switch of claim 31, wherein transmission of data in response to the store and forward request begins when a FIFO of a port has a packet in it.

33. The network switch of claim 32, wherein, upon detection of a deadlock for the packets greater than the predetermined size, the arbitrator aborts a FIFO that causes the deadlock, and rotates to another FIFO.

34. The network switch of claim 33, wherein each cross point has a plurality of FIFOs corresponding to ports of at least one other cross point.

35. The network switch of claim 26, wherein the transmission of data in response to the cut-through request begins when a FIFO of a port has data in it.

36. The network switch of claim 26, wherein transmission of data in response to the store and forward request begins when a FIFO of a port has a packet in it.

37. The network switch of claim 26, wherein, upon detection of a deadlock for the packets greater than the predetermined size, the arbitrator aborts a FIFO that causes the deadlock, and rotates to another FIFO.

38. The network switch of claim 26, further including a plurality of blades connected to a corresponding port, each of the blades having a plurality of FIFOs corresponding to other ports of the same cross point.

39. The network switch of claim 26, wherein each cross point has a plurality of FIFOs corresponding to ports of at least one other cross point.

40. The network switch of claim 26, wherein, upon detection of a deadlock, the packet-switch arbitrator aborts a FIFO that causes the deadlock, and rotates to another FIFO.

41. A switch comprising:
a switching fabric connecting a plurality of ports;
a plurality of FIFOs for temporarily storing data traffic from the ports; and
a multi-level arbitrator that arbitrates the data traffic between the ports using two levels of arbitration,
wherein a first level arbitration is used by the multi-level arbitrator for FIFOs with at least some data, and
wherein a second level arbitration is used by the multi-level arbitrator for FIFOs with at least one packet.

42. The network switch of claim 41, wherein, upon detection of a deadlock, the multi-level arbitrator aborts a FIFO that causes the deadlock, and rotates to another FIFO.

43. A method of switching data traffic comprising the steps of:
receiving a packet;
determining size and destination of the packet; and arbitrating packet transmission based on the size of the packet, wherein the packet transmission is arbitrated such that one cycle's worth of data from a single source is transmitted to a single destination within a cross point of a digital switch, and such that a complete packet is transmitted from one source to one destination between different cross points of the digital switch.

44. The method of claim 43, wherein the packet is arbitrated using two-level arbitration.

45. The method of claim 43, further including the steps of:

aborting a FIFO that causes the deadlock upon detection of a deadlock for packets larger than a predetermined size; and rotating to another FIFO.

46. A method of switching data traffic comprising the steps of:

receiving packets from a plurality of sources;

determining size and destination of the packets;

arbitrating packet transmission of packets larger than a predetermined size in response to a cut-through request; and arbitrating packet transmission of packets smaller than a predetermined size in response to a store-and-forward request.

47. The method of claim 46, wherein the packet is arbitrated using two-level arbitration.

48. The method of claim 47, further including the steps of:

aborting a FIFO of a source that causes the deadlock upon detection of a deadlock for packets greater than the predetermined size; and rotating to a FIFO of another source.

49. The method of claim 48, further including the steps of:

detecting back-pressure during the step of receiving packets;

completing arbitration of the packet transmission; and rotating to service another requesting source.

50. The method of claim 46, further including the steps of:

aborting a FIFO of a source that causes the deadlock upon detection of a deadlock for packets greater than the predetermined size; and rotating to a FIFO of another source.

51. The method of claim 46, further including the steps of:

detecting back-pressure during the step of receiving packets;

completing arbitration of the packet transmission; and rotating to service another requesting source.

52. The switch of claim 41, wherein each port has a dedicated FIFO.

53. The switch of claim 41, wherein the first level arbitration occurs within the same cross-point of the switch.

54. The switch of claim 41, wherein the second level arbitration occurs between different cross-points of the switch.

55. The switch of claim 41, wherein the first level arbitration occurs within the same cross-point of the switch and the second level arbitration occurs between different cross-points of the switch.

56. The switch of claim 41, wherein the second level arbitration occurs after the first level of arbitration.

57. The switch of claim 41, wherein the first level arbitration includes a cut through request, and the second level of arbitration includes a store-and-forward request.

58. The switch of claim 41, wherein one FIFO of the plurality of FIFOs is used for the first level arbitration, and a different FIFO of the plurality of FIFOs is used for the second level arbitration.

59. The switch of claim 58, wherein the first level arbitration includes a cut through request, and the second level of arbitration includes a store-and-forward request.

60. The switch of claim 59, wherein the first level of arbitration occurs within the same cross-point of the switch and the second level of arbitration occurs between different cross-points of the switch.

61. The switch of claim 60, wherein the second level arbitration occurs after the first level arbitration.

62. The switch of claim 61, wherein each port has a dedicated FIFO.

* * * * *

UNITED STATES PATENT AND TRADEMARK OFFICE
CERTIFICATE OF CORRECTION

PATENT NO.   : 6,671,275 B1  
DATED        : December 30, 2003  
INVENTOR(S)  : Ming G. Wong and Xiaodong Zhao It is certified that error appears in the above-identified patent and that said Letters Patent is hereby corrected as shown below:

<u>Column 9,</u>  
Line 42, replace "(FHFOs" with -- (FIFOs --.

Signed and Sealed this

Thirty-first Day of August, 2004

JON W. DUDAS  
*Director of the United States Patent and Trademark Office*